G. E. GOODRICH.
CLEANER FOR AUTOMOBILE WIND SHIELDS.
APPLICATION FILED APR. 12, 1915.
1,211,698.
Patented Jan. 9, 1917.
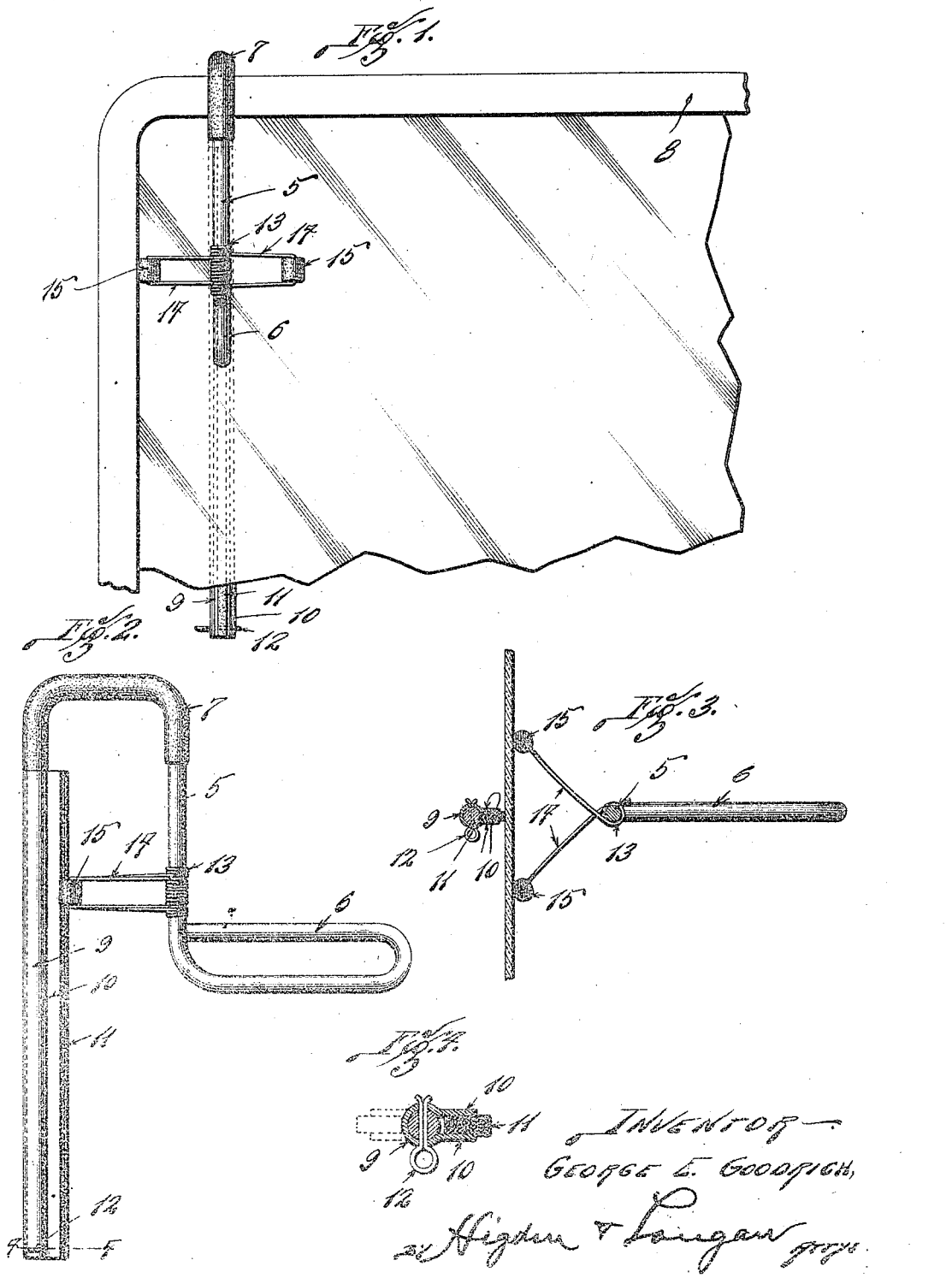

UNITED STATES PATENT OFFICE.

GEORGE E. GOODRICH, OF ST. LOUIS, MISSOURI.

CLEANER FOR AUTOMOBILE WIND-SHIELDS.

1,211,698.  Specification of Letters Patent.  Patented Jan. 9, 1917.

Application filed April 12, 1915. Serial No. 20,732.

*To all whom it may concern:*

Be it known that I, GEORGE E. GOODRICH, a citizen of the United States, and resident of St. Louis, Missouri, have invented certain new and useful Improvements in Cleaners for Automobile Wind-Shields, of which the following is a specification, containing a full, clear, and exact description, reference being had to the accompanying drawings, forming a part hereof.

My invention relates to improvements in cleaners for automobile wind shields, and consists in the novel construction hereinafter described and specifically designated in the appended claims.

The object of my invention is to provide an improved cleaner for the glass wind shields of automobiles and for other glass windows, which shall have oppositely-projecting spring-pressed guide-braces carrying rollers, and be adapted for attachment direct to the wind shield, where it will be ready for instant use in removing snow, ice, or other obstructions from the glass.

Heretofore much inconvenience and danger has been occasioned by the accumulation of snow, ice, and drops of rain upon the glass wind shields of automobiles, and a further object of my invention is to provide an improved device which shall be ready for instant use in the removal of said obstructions from said wind shields.

In the drawings: Figure 1 is an elevation of a portion of an automobile wind shield having my invention applied thereto; Fig. 2 is a side elevation of my improved cleaner for automobile wind shields; Fig. 3 is a horizontal section taken through a pane of glass and through my improved clearing device; and Fig. 4 is a horizontal detail section taken on the line 4—4 of Fig. 2.

Referring by numerals to the accompanying drawings: 5 indicates a U-shaped frame, preferably made of a single piece of round metallic rod, with an integral handle 6 formed by doubling the said rod upon itself at a point about midway of the length of the U-shaped frame. Mounted upon the upper end of said U-shaped frame is a tubular rubber cushion 7, which during operation rests in contact with the wind shield frame 8, and prevents the said U-shaped frame from scratching or otherwise marring the wind shield frame. Mounted upon the longer arm of said U-shaped frame 5 is the metallic "squeegee" frame 9 having opposite stamping jaws 10 between which is secured by pressure of said jaws and also by a suitable common cement a strip of rubber 11. Said rubber strip 11 projects in the usual way from said clamping jaws, so that it may engage the glass and clean the same. The said jaws 10, when my device is to be used as a cleaner for automobile wind shields, projects inwardly toward said handle 6 as shown, but when my device is to be used as a common window cleaner or "squeegee" the said frame 9 is reversed by being rotated upon the said long arm of said U-shaped frame 5 until said jaws project in an opposite direction, as indicated by dotted lines in Fig. 4, in which position the device may be used as a common "squeegee" for cleaning all kinds of window glass. The said frame 9 is rotatably mounted upon the said long arm of said U-shaped frame 5, but is locked against rotation during use by a split pin 12 passed through registering apertures in the said frame 9 and in the said long arm, as shown more clearly in Fig. 4. Mounted upon the short arm of said U-shaped frame, at a point adjacent the said handle 6, is a coil of spring wire 13 from which project in opposite directions two spring bracing and guiding arms 14 carrying at their free ends rubber rollers 15.

The operation is as follows: In cleaning a glass wind shield of an automobile, the cleaner is mounted upon a wind shield as shown in Fig. 1, and with the strip of rubber 11 upon the outside of the wind shield and with the rubber rollers 15 in engagement with the opposite side of the wind shield glass, and then the operator grasps the said handle 6 and moves the entire cleaner back and forth, thereby causing the said strip of rubber 11 to remove from said glass any snow, ice, rain or dust, after which the device may be entirely removed from the wind shield, or permitted to rest in one corner thereof, as shown in Fig. 1. The said rubber rollers 15 and the spring braces 14 act as guides and braces for the device, and hold said handle 6 at substantially a right-angle to the glass, and also keep the strip of rubber in proper engagement with the glass during the cleaning operation.

In using my cleaner for cleaning ordinary windows, the rubber strip 11 and its clamping jaws are reversed, as indicated by dotted lines in Fig. 4, when the device may be used as a common "squeegee" cleaner.

I claim:

1. A window cleaning device, having a U-shaped frame, a handle projecting at right angles from said frame, and a single rubber "squeegee" frame rotatably mounted upon one arm of said U-shaped frame and adapted to project inwardly in cleaning automobile wind shields, and means for permitting said frame to be reversed upon said arm and to project outwardly when the device is used as an ordinary window cleaner, and a suitable locking-device for securing said frame after its reversal.

2. A window cleaner having a U-shaped frame, a handle projecting from said frame, a "squeegee" clamping frame carried by said U-shaped frame, and two oppositely-projecting spring bracing arms also carried by said U-shaped frame and adapted to brace and guide the device during the operation of cleaning glass.

3. A window cleaner having a U-shaped frame, a handle projecting from said frame, a "squeegee" clamping frame carried by said U-shaped frame, two oppositely-projecting spring bracing arms also carried by said U-shaped frame and adapted to brace and guide the device during the operation of cleaning glass, and rollers carried at the outer ends of said spring bracing arms and adapted to engage the glass.

In testimony whereof, I have signed my name to this specification, in presence of two subscribing witnesses.

GEORGE E. GOODRICH.

Witnesses:
   E. L. WALLACE,
   JOHN C. HIGDON.